(12) United States Patent
Kuhlman

(10) Patent No.: US 12,441,748 B2
(45) Date of Patent: Oct. 14, 2025

(54) METAL-LIGAND COMPLEXES

(71) Applicant: Dow Global Technologies LLC, Midland, MI (US)

(72) Inventor: Roger L. Kuhlman, Freeport, TX (US)

(73) Assignee: Dow Global Technologies LLC, Midland, MI (US)

(*) Notice: Subject to any disclaimer, the term of this patent is extended or adjusted under 35 U.S.C. 154(b) by 904 days.

(21) Appl. No.: 17/600,368

(22) PCT Filed: Apr. 27, 2020

(86) PCT No.: PCT/US2020/030033
§ 371 (c)(1),
(2) Date: Sep. 30, 2021

(87) PCT Pub. No.: WO2020/223142
PCT Pub. Date: Nov. 5, 2020

(65) Prior Publication Data
US 2022/0259231 A1    Aug. 18, 2022

Related U.S. Application Data

(60) Provisional application No. 62/990,549, filed on Mar. 17, 2020, provisional application No. 62/840,865, filed on Apr. 30, 2019, provisional application No. 62/840,835, filed on Apr. 30, 2019.

(51) Int. Cl.
*C08F 4/6592* (2006.01)
*C07F 7/28* (2006.01)
*C07F 17/00* (2006.01)

(52) U.S. Cl.
CPC ............ *C07F 7/28* (2013.01); *C08F 4/65925* (2013.01)

(58) Field of Classification Search
CPC ............................. C07F 17/00; C08F 4/65927
See application file for complete search history.

(56) References Cited

U.S. PATENT DOCUMENTS

| | | | |
|---|---|---|---|
| 2007/0060722 A1 | 3/2007 | Jayaratne et al. | |
| 2013/0053523 A1 | 2/2013 | Jayaratne et al. | |
| 2018/0298128 A1 | 10/2018 | Harlan et al. | |
| 2019/0263944 A1 | 8/2019 | Kuhlman et al. | |
| 2021/0147591 A1 | 5/2021 | Borse et al. | |
| 2022/0220230 A1* | 7/2022 | Kuhlman | C07F 17/02 |
| 2022/0411546 A1 | 12/2022 | Young et al. | |

OTHER PUBLICATIONS

International Search Report & Written Opinion for related PCT Application PCT/US2020/030033, mailed Jul. 29, 2020 (16 pgs).
Schumann, et al., "Synthesis, Characterization, and Catalytic Properties of Bis[alkylindenyl]-, Bis[alkenylindenyl]- and [Alkenylindenyl(cyclopentadienyl)] Zirconium Dichloride Complexes"; Journal of Organometallic Chemistry, vol. 636, No. 1-2, Nov. 25, 2001 (6 pgs).
Parveen, et al., "DFT and QSAR Studies of Ethylene Polymerization by Zirconocene Catalysts"; ACS Catalysis, vol. 9, No. 10, Sep. 4, 2019 (10 pgs).
Schumann et al., "Synthesis, characterization, and catalytic properties of bis[alkylindenyl]-, bis[alkenylindenyl]- and [alkenylindenyl(cyclopentadienyl)]zirconium dicholoride complexes", Journal of Organometallic Chemistry, 2001, vol. 636, pp. 31-40.
International Preliminary Report on Patentability for related PCT Application No. PCT/US2020/030033, mailed Nov. 11, 2021 (10 pgs).
European Examination Report for EP20727751.8, dated Jan. 7, 2025.

* cited by examiner

*Primary Examiner* — Catherine S Branch

(57) ABSTRACT

Embodiments of the present disclosure directed towards metal-ligand complex of Formula I: wherein M is titanium, zirconium, or hafnium; R is hydrogen or a ($C_1$ to $C_4$)alkyl; $R^1$ is a ($C_1$ to $C_4$) alkyl; any one or two of $R^2$, $R^3$, $R^4$, $R^5$ is independently a ($C_1$ to $C_{20}$) alkyl and the three or two of $R^2$, $R^3$, $R^4$, $R^5$ is H; and each X is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl.

(I)

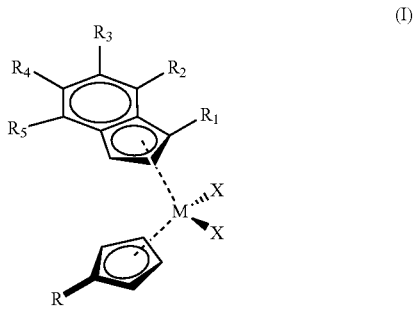

6 Claims, No Drawings

METAL-LIGAND COMPLEXES

This application is a National Stage Application under 35 U.S.C. § 371 of International Application Number PCT/US2020/030033, filed Apr. 27, 2020, and published as WO 2020/223142 A1 on Nov. 5, 2020, which claims the benefit to U.S. Provisional Application's 62/990,549, filed Mar. 17, 2020, 62/840,835, filed Apr. 30, 2019 and 62/840,865, filed Apr. 30, 2019, the entire contents of which are incorporated herein by reference in its entirety

FIELD OF DISCLOSURE

Embodiments of the present disclosure are directed towards metal-ligand complexes, more specifically, metal-ligand complexes that may be utilized to make olefin polymerization catalysts.

BACKGROUND

Polymers may be utilized for a number of products including as films, fibers, nonwoven and/or woven fabrics, extruded articles, and/or molded articles, among others. Polymers can be formed by reacting one or more types of monomer in a polymerization reaction in the presence of a polymerization catalyst.

SUMMARY

The present disclosure provides various embodiments, including:

A metal-ligand complex of Formula I:

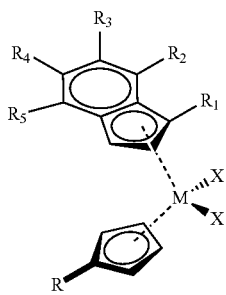

Formula I wherein M is titanium, zirconium, or hafnium; R is hydrogen or a ($C_1$ to $C_4$) alkyl; $R^1$ is a ($C_1$ to $C_4$) alkyl; any one or two of $R^2$, $R^3$, $R^4$, $R^5$ is independently a ($C_1$ to $C_{20}$) alkyl and the three or two of $R^2$, $R^3$, $R^4$, $R^5$ is H; and each X is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl.

A bimodal catalyst system comprising the metal-ligand complex of Formula I and a bis(2-(pentamethylphenylamido)ethyl)-amine zirconium complex of Formula III:

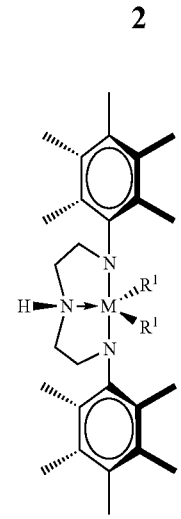

Formula III wherein M is Zr and each $R^1$ independently is Cl, Br, a ($C_1$ to $C_{20}$) alkyl, a ($C_1$ to $C_6$) alkyl-substituted ($C_6$-$C_{12}$) aryl, benzyl, or a ($C_1$ to $C_6$) alkyl-substituted benzyl.

A method of making a polymerization catalyst, the method comprising contacting, under activating conditions, the metal-ligand complex of Formula I or the bimodal catalyst system with an activator so as to activate the metal-ligand complex or the bimodal catalyst system, thereby making the polymerization catalyst.

A method of making a polyolefin polymer, the method comprising contacting, under polymerization conditions, an olefin with the polymerization catalyst so as to polymerize the olefin, thereby making a polyolefin polymer.

A polyolefin polymer made by the method of making same.

DETAILED DESCRIPTION

The metal-ligand complexes disclosed herein can be represented by Formula I:

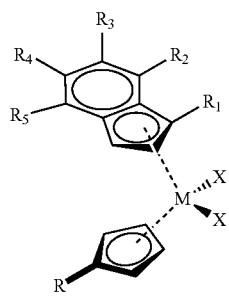

Formula I wherein M is titanium, zirconium, or hafnium; R is hydrogen or a ($C_1$ to $C_4$) alkyl; $R^1$ is a ($C_1$ to $C_4$) alkyl; any one or two of $R^2$, $R^3$, $R^4$, $R^5$ is independently a ($C_1$ to $C_{20}$) alkyl and the three or two of $R^2$, $R^3$, $R^4$, $R^5$ is H; and each X is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl.

The metal-ligand complexes may be utilized to make polymerization catalysts, e.g. non-symmetric unbridged metallocene polymerization catalysts. For instance, the metal-ligand complex may be contacted, under activating conditions, with an activator so as to activate the metal-ligand complex, thereby making the polymerization catalyst. Embodiments provide a method of making a polymerization catalyst, the method comprising contacting, under activating conditions, the metal-ligand complex of Formula I or the bimodal catalyst system with an activator so as to activate the metal-ligand complex or the bimodal catalyst system, thereby making the polymerization catalyst. The polymerization catalyst made from only one metal-ligand complex is useful for making a polyolefin polymer characterized by a unimodal molecular weight distribution. The polymerization catalyst made from the bimodal catalyst system is useful for making a polyolefin polymer characterized by a bimodal molecular weight distribution.

Surprisingly, the polymerization catalysts made from the metal-ligand complexes can help to provide polymers having an improved, i.e., reduced, melt index (($I_2$); D1238-13 (190° C., 2.16 kg load)), as compared to polymers formed with other non-symmetric unbridged metallocene(non-inventive) polymerization catalysts at similar polymerization conditions. A reduced melt index is desirable in some applications.

In addition, surprisingly the polymerization catalysts made from the metal-ligand complexes can provide polymers having an improved, i.e., increased, melting temperature as compared to polymers formed with other non-symmetric unbridged metallocene polymerization catalysts at similar polymerization conditions. An increased melting temperature is desirable in some applications.

Additionally, the polymerization catalysts made from the metal-ligand complexes may help to provide polymers having an improved, i.e., increased, molecular weight (Mn, Mw, and/or Mz) as compared to polymers formed with other non-symmetric unbridged metallocene polymerization catalysts at similar polymerization conditions. An increased molecular weight (Mn, Mw, and/or Mz) is desirable in some applications.

Further, the polymerization catalysts made from the metal-ligand complexes may help to provide polymers having an improved, i.e., increased, density as compared to polymers formed with other non-symmetric unbridged metallocene polymerization catalysts at similar polymerization conditions. An increased density is desirable in some applications.

As mentioned, R is hydrogen or a ($C_1$ to $C_4$) alkyl. One or more embodiments provide that R is a ($C_1$ to $C_3$) alkyl. One or more embodiments provide that R is a ($C_1$ to $C_2$) alkyl. One or more embodiments provide that R is a $C_1$ alkyl. One or more embodiments provide that R is a $C_2$ alkyl. One or more embodiments provide that R is a $C_3$ alkyl. One or more embodiments provide that R is a $C_4$ alkyl.

As mentioned, $R^1$ is a ($C_1$ to $C_4$) alkyl. One or more embodiments provide that $R^1$ is a ($C_1$ to $C_3$) alkyl. One or more embodiments provide that $R^1$ is a ($C_1$ to $C_2$) alkyl. One or more embodiments provide that $R^1$ is a $C_1$ alkyl. One or more embodiments provide that $R^1$ is a $C_2$ alkyl. One or more embodiments provide that $R^1$ is a $C_3$ alkyl. One or more embodiments provide that $R^1$ is a $C_4$ alkyl.

As mentioned, any one or two of $R^2$, $R^3$, $R^4$, $R^5$ is independently a ($C_1$ to $C_{20}$) alkyl and the three or two of $R^2$, $R^3$, $R^4$, $R^5$ is H. One or more embodiments provide that any one or two of $R^2$, $R^3$, $R^4$, $R^5$ is independently a ($C_1$ to $C_{10}$) alkyl and the three or two of $R^2$, $R^3$, $R^4$, $R^5$ is H. One or more embodiments provide that any one or two of $R^2$, $R^3$, $R^4$, $R^5$ is independently a ($C_1$ to $C_6$) alkyl and the three or two of $R^2$, $R^3$, $R^4$, $R^5$ is H. One or more embodiments provide that any one or two of $R^2$, $R^3$, $R^4$, $R^5$ is independently a ($C_1$ to $C_3$) alkyl and the three or two of $R^2$, $R^3$, $R^4$, $R^5$ is H. One or more embodiments provide that any one or two of $R^2$, $R^3$, $R^4$, $R^5$ is independently a ($C_1$ to $C_2$) alkyl and the three or two of $R^2$, $R^3$, $R^4$, $R^5$ is H. One or more embodiments provide that any one or two of $R^2$, $R^3$, $R^4$, $R^5$ is independently a $C_1$ alkyl and the three or two of $R^2$, $R^3$, $R^4$, $R^5$ is H.

As mentioned, each X is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl. One or more embodiments provide that each X is independently Cl. One or more embodiments provide that each X is independently a ($C_1$ to $C_{20}$) alkyl. One or more embodiments provide that each X is independently a ($C_1$ to $C_{15}$) alkyl. One or more embodiments provide that each X is independently a ($C_1$ to $C_{10}$) alkyl. One or more embodiments provide that each X is independently a ($C_1$ to $C_5$) alkyl. One or more embodiments provide that each X is independently a $C_1$ alkyl. One or more embodiments provide that each X is independently a silicon-containing alkyl. One or more embodiments provide that each X is independently a tri-hydrocarbylsilylmethyl. One or more embodiments provide that each X is independently a trimethylsilylmethyl.

The metal-ligand complexes of Formula I may be referred to as a metallocene complexes. Examples of the metal-ligand complexes of Formula I include but are not limited to: cyclopentadienyl(1,4,7-trimethylindenyl) zirconium dichloride; cyclopentadienyl(1,5,7-trimethylindenyl) zirconium dichloride; methylcyclopentadienyl(1,4, -dimethylindenyl) zirconium dichloride; methylcyclopentadienyl(1,6, -dimethylindenyl) zirconium dichloride; methylcyclopentadienyl(1,7, -dimethylindenyl) zirconium dichloride; methylcyclopentadienyl(1,4,7-trimethylindenyl) zirconium dichloride; methylcyclopentadienyl(1,5,7-trimethylindenyl) zirconium dichloride; propylcyclopentadienyl(1,5-dimethylindenyl) zirconium dichloride; propylcyclopentadienyl(1,6, -dimethylindenyl) zirconium dichloride; propylcyclopentadienyl(1,7, -dimethylindenyl) zirconium dichloride; propylcyclopentadienyl(1,4,7-trimethylindenyl) zirconium dichloride; propylcyclopentadienyl(1,5,7-trimethylindenyl) zirconium dichloride, cyclopentadienyl(1,5-dimethylindenyl) zirconium dichloride; methylcyclopentadienyl(1,5-dimethylindenyl) zirconium dichloride; cyclopentadienyl(1,5-dimethylindenyl) zirconium dimethyl; and methylcyclopentadienyl(1,5-dimethylindenyl) zirconium dimethyl.

One or more embodiments provide that the metal-ligand complexes of Formula I comprise a di-substituted indenyl group, e.g., where each indenyl substitution is independently a ($C_1$ to $C_4$) alkyl. For instance, the metal-ligand complexes may comprise di-substituted indenyl, a 1,5-di-substituted indenyl, a 1,6-di-substituted indenyl, or a 1,7-di-substituted indenyl. As used herein, the following indenyl numbering is utilized:

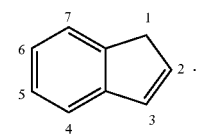

As mentioned, $R^1$, as illustrated in FIG. 1, is a ($C_1$ to $C_4$) alkyl. Further, as illustrated in FIG. 1, the 2 position and the 3 position of the five-member ring of the indenyl are each substituted by hydrogen. As such, the metal-ligand complexes of Formula I may be referred to as non-symmetric unbridged metal-ligand complexes. Non-symmetric unbridged metal-ligand complexes are a particular class of metal-ligand complexes that are desirable for a number of applications. As known in the art, non-symmetric unbridged metal-ligand complexes can advantageously have excellent stability when stored as activated, supported catalyst formulations; may be utilized to produce polyethylene polymers with zero, undetectable, or extremely low levels of long chain branching; and may be operable in a gas phase reactor in such manner that incidences of fouling and/or sheeting are reduced as compared to other catalysts and/or can be controlled by known methods.

One or more embodiments provide that the metal-ligand complexes disclosed herein may be represented by Formula II:

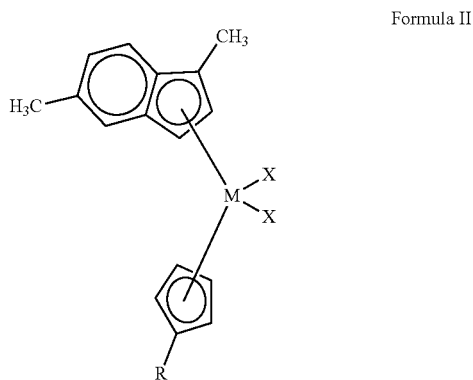

Formula II wherein R is hydrogen or a ($C_1$ to $C_2$) alkyl, M is titanium, zirconium, or hafnium, and where each X is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl. As shown in Formula II, $R^1$ as shown in Formula I is a $C_1$ alkyl, $R^2$ as shown in Formula I is hydrogen, $R^3$ as shown in Formula I is hydrogen, $R^4$ as shown in Formula I a $C_1$ alkyl, and as shown in Formula I $R^5$ is hydrogen.

A metal-ligand complex of Formula II may be referred to as cyclopentadienyl(1,5-dimethylindenyl) zirconium dimethyl, e.g., when R is hydrogen, M is zirconium, and each X is a $C_1$ alkyl; or a metal-ligand complex of Formula II may be referred to as methylcyclopentadienyl(1,5-dimethylindenyl) zirconium dimethyl, e.g., when R is a $C_1$ alkyl, M is zirconium, and each X is a $C_1$ alkyl, for instance.

R as shown in Formula I and Formula II, can be is hydrogen or a ($C_1$ to $C_4$) alkyl. One or more embodiments provide that R is hydrogen. One or more embodiments provide that R is a ($C_1$ to $C_4$) alkyl. For instance, R can be: a $C_1$ alkyl, e.g. methyl; a $C_2$ alky, a $C_3$ alkyl, e.g. propyl, or a $C_4$ alkyl, e.g. butyl. The "alkyl" may be linear, branched, when sufficient carbon atoms are present, or a cyclic paraffin radicals, when sufficient carbon atoms are present, that are deficient by one hydrogen. Thus, for example, a $CH_3$ group ("methyl") and a $CH_3CH_2$ group ("ethyl") are examples of alkyls.

M, as shown in Formula I and Formula II, can be titanium, zirconium, or hafnium. One or more embodiments provide that M is titanium. One or more embodiments provide that M is zirconium. One or more embodiments provide that M is hafnium.

As mentioned, each X, as shown in Formula I and Formula II, is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl. One or more embodiments provide that each X is a halide, e.g. Cl. One or more embodiments provide that each X is a ($C_1$ to $C_3$) alkyl, e.g. a $C_1$ alkyl, a $C_2$ alkyl, or a $C_3$ alkyl. One or more embodiments provide that each X is benzyl.

As used herein, "substituted" indicates that the group following that term possesses at least one moiety in place of one or more hydrogens in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof.

The metal-ligand complexes of Formula I, which include the metal-ligand complexes of Formula II, can be made utilizing reactants mentioned herein. The metal-ligand complex of Formula I can be made by a number of processes, e.g. with conventional solvents, reaction conditions, reaction times, and isolation procedures, utilized for making known metallocenes.

One or more embodiments provide a polymerization catalyst. The polymerization catalyst can be made by contacting, under activating conditions, the metal-ligand complex of complex of Formula I and an activator to provide the polymerization catalyst, e.g. an activated the metal-ligand complex Formula I. Activating conditions are well known in the art.

As used herein, "activator" refers to any compound or combination of compounds, supported, or unsupported, which can activate a complex or a catalyst component, such as by creating a cationic species of the catalyst component. For example, this can include the abstraction of at least one leaving group, e.g., the "X" group described herein, from the metal center of the complex/catalyst component, e.g. the metal complex of Formula I. The activator may also be referred to as a "co-catalyst". As used herein, "leaving group" refers to one or more chemical moieties bound to a metal atom and that can be abstracted by an activator, thus producing a species active towards olefin polymerization.

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as dimethylanilinium tetrakis(pentafluorophenyl)borate, triphenylcarbenium tetrakis(pentafluorophenyl)borate, dimethylanilinium tetrakis(3,5-$(CF_3)_2$phenyl)borate, triphenylcarbenium tetrakis(3,5-$(CF_3)_2$phenyl)borate, dimethylanilinium tetrakis(perfluoronapthyl)borate, triphenylcarbenium tetrakis(perfluoronapthyl)borate, dimethylanilinium tetrakis(pentafluorophenyl)aluminate, triphenylcarbenium tetrakis(pentafluorophenyl)aluminate, dimethylanilinium tetrakis(perfluoronapthyl)aluminate, triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

Aluminoxanes can be described as oligomeric aluminum compounds having -Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

The polymerization catalyst, which is made from the metal-ligand complex of complex of Formula I, can be utilized to make a polymer. For instance, the polymerization catalyst and an olefin can be contacted under polymerization conditions to form a polymer, e.g., a polyolefin polymer.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to form a polymer.

Embodiments provide that the polymer can be a polyolefin polymer. As used herein an "olefin," which may be referred to as an "alkene," refers to a linear, branched, or cyclic compound including carbon and hydrogen and having at least one double bond. As used herein, when a polymer or copolymer is referred to as comprising, e.g., being made from, an olefin, the olefin present in such polymer or copolymer is the polymerized form of the olefin. For example, when a copolymer is said to have an ethylene content of 75 wt % to 85 wt %, it is understood that the polymer unit in the copolymer is derived from ethylene in the polymerization reaction and the derived units are present at 75 wt % to 85 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas phase polymerization process. In another embodiment, ethylene and/or propylene can be polymerized with at least two different comonomers, optionally one of which may be a diene, to form a terpolymer.

One or more embodiments provide that the polymer can include from 50 to 99.9 wt % of units derived from ethylene based on a total weight of the polymer. All individual values and subranges from 50 to 99.9 wt % are included; for example, the polymer can include from a lower limit of 50, 60, 70, 80, or 90 wt % of units derived from ethylene to an upper limit of 99.9, 99.7, 99.4, 99, 96, 93, 90, or 85 wt % of units derived from ethylene based on the total weight of the polymer. The polymer can include from 0.1 to 50 wt % of units derived from comonomer based on the total weight of the polymer.

As mentioned, surprisingly, the polymerization catalysts made from the metal-ligand complexes of Formula I can help to provide polymers having an improved, i.e., reduced, melt index (($I_2$); D1238-13 (190° C., 2.16 kg load)), as compared to polymers formed with other polymerization catalysts at similar polymerization conditions. For instance, the polymerization catalysts made from the metal-ligand complexes can help to provide polymers having a reduced melt index (($I_2$); D1238-13 (190° C., 2.16 kg load)), as compared to polymers formed with other polymerization catalysts when both polymerizations occur at a same polymerization temperature, a same hydrogen concentration, and/or a same comonomer to monomer ratio.

In addition, as mentioned, surprisingly the polymerization catalysts made from the metal-ligand complexes of Formula I can help to provide polymers having an improved, i.e., increased, melting temperature as compared to polymers formed with other polymerization catalysts at similar polymerization conditions. For instance, the polymerization catalysts made from the metal-ligand complexes can help to provide polymers having an increased melting temperature, as compared to polymers formed with other polymerization catalysts when both polymerizations occur at a same polymerization temperature, a same hydrogen concentration, and/or a same comonomer to monomer ratio.

Embodiments provide that the polymer can have a melt index ($I_2$) as measured by D1238-13 (at 190° C., 2.16 kg load) in the range from 0.001 g/10 min to 1000 g/10 min. For instance, the polymers can have a melt index from 0.001 g/10 min to 500 g/10 min, or from 0.1 g/10 min to 320 g/10 min. Some embodiments provide that the melt index is less than 310, less than 300, less than 290, less than 280, less than 270, less than 260, less than 250, less than 240, less than 230, or less than 220.

Embodiments provide that the polymer can have a Mn (number average molecular weight) from 5,000 to 75,000. All individual values and subranges from 5,000 to 75,000 are included; for example, the polymer can have a Mn from a lower limit of 5,000; 6,000; 7,000; 7,500; 8,000; or 8,500 to an upper limit of 75,000; 65,000; 55,000; 45,000; 35,000; 25,000; 24,000; 23,000; or 22,000. Mn can be determined by gel permeation chromatography (GPC), as is known in the art.

Embodiments provide that the polymer can have a Mw (weight average molecular weight) from 15,000 to 110,000. All individual values and subranges from 15,000 to 110,000 are included; for example, the polymer can have a Mw from a lower limit of 15,000; 20,000; 22,000; 24,000; 24,500; or 25,000 to an upper limit of 110,000; 100,000; 80,000; 60,000; or 40,000. Mw can be determined by GPC, as is known in the art.

Embodiments provide that the polymer can have a Mz (z-average molecular weight) from 40,000 to 400,000. All individual values and subranges from 40,000 to 400,000 are included; for example, the polymer can have a Mz from a lower limit of 40,000; 44,000; 46,000; 47,000; 48,000; 48,500; or 49,000 to an upper limit of 400,000; 300,000; 200,000; 100,000; or 65,000. Mz can be determined by GPC, as is known in the art.

Embodiments provide that the polymer can have a molecular weight distribution, determined as Mw/Mn (weight average molecular weight/number average molecular weight) from 2.50 to 8.00. All individual values and subranges from 2.50 to 8.00 are included; for example, the polymer can have a Mw/Mn from a lower limit of 2.50; 2.80; 2.90; 3.00; or 3.10 to an upper limit of 8.00; 7.50; 7.00; or 6.50. Mw/Mn can be determined by GPC analysis, as is known in the art.

Embodiments provide that the polymer can have a melting temperature from 100 to 165° C. All individual values and subranges from 100 to 165° C. are included; for example, the polymer can have a melting temperature from a lower limit of 100, 110, 120, 125, 128, 129, 130° C. to an upper limit of 165, 160, 155, 150, 140 or 135° C. Melting temperature can be determined via Differential Scanning calorimetry according to ASTM D 3418-08.

Embodiments provide that the polymer can have a density of from 0.890 g/cm³ to 0.970 g/cm³. All individual values and subranges from 0.890 to 0.970 g/cm³ are included; for example, the polymer can have a density from a lower limit of 0.890, 0.900, 0.910, 0.920, 0.930, 0.940, 0.950, 0.957, 0.958, 0.959, or 0.960 g/cm³ to an upper limit of 0.970, 0.966, 0.966, or 0.963 g/cm³. Density can be determined in accordance with ASTM D-792-13, Standard Test Methods for Density and Specific Gravity (Relative Density) of Plastics by Displacement, Method B (for testing solid plastics in liquids other than water, e.g., in liquid 2-propanol). Results can be reported in units of grams per cubic centimeter (g/cm³).

One or more embodiments provide that the polymer can be a bimodal polymer. For instance, the bimodal polymer may comprise a low molecular weight component, e.g., as described herein.

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog(MW) on the y-axis versus Log(MW) on the x-axis to give a GPC chromatogram, wherein Log(MW) and dW/dLog(MW) are as defined above.

The polymer can be utilized for a number of articles such as films, fibers, nonwoven and/or woven fabrics, extruded articles, and/or molded articles, among others.

Provided is a bimodal catalyst bimodal catalyst system comprising the metal-ligand complex of Formula I and a bis(2-(pentamethylphenylamido)ethyl)-amine zirconium complex of Formula III:

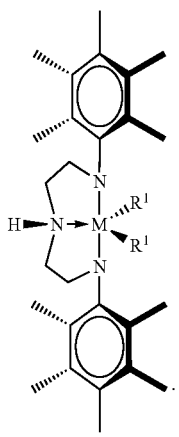

Formula III

Also provided is a bimodal catalyst system comprising the metal-ligand complex of Formula I or an activation reaction product thereof and at least one olefin polymerization catalyst (second catalyst) that is not the metal-ligand complex of Formula I or III or an activation reaction product thereof. Such a second catalyst may be a Ziegler-Natta catalyst, a chromium-based catalyst (e.g., a so-called Phillips catalyst), a metallocene catalyst that is free of an indenyl ring (e.g., a metallocene catalyst that contains unsubstituted and/or alkyl-substituted cyclopentadienyl rings), a Group 15 metal-containing catalyst compound described in paragraphs [0041] to [0046] of WO 2018/064038 A1, or a biphenylphenolic catalyst compound described in paragraphs [0036] to [0080] of US20180002464A1.

The metal-ligand complex of Formula I, as well as other components discussed herein such as the activator and/or an additional polymerization component, may be utilized with a support. A "support", which may also be referred to as a "carrier", refers to any support material, including a porous support material, such as talc, inorganic oxides, and inorganic chlorides.

The metal-ligand complex of Formula I, as well as other components discussed herein, can be supported on the same or separate supports, or one or more of the components may be used in an unsupported form. Utilizing the support may be accomplished by any technique used in the art. One or more embodiments provide that a spray dry process is utilized. Spray dry processes are well known in the art. The support may be functionalized.

The support may be a porous support material, for example, talc, an inorganic oxide, or an inorganic chloride. Other support materials include resinous support materials, e.g., polystyrene, functionalized or crosslinked organic supports, such as polystyrene divinyl benzene polyolefins or polymeric compounds, zeolites, clays, or any other organic or inorganic support material and the like, or mixtures thereof.

Support materials include inorganic oxides that include Group 2, 3, 4, 5, 13 or 14 metal oxides. Some preferred supports include silica, fumed silica, alumina, silica-alumina, and mixtures thereof. Some other supports include magnesia, titania, zirconia, magnesium chloride, montmorillonite, phyllosilicate, zeolites, talc, clays) and the like. Also, combinations of these support materials may be used, for example, silica-chromium, silica-alumina, silica-titania and the like. Additional support materials may include porous acrylic polymers, nanocomposites, aerogels, spherulites, and polymeric beads.

An example of a support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyldichloride such that a majority of the surface hydroxyl groups are capped.

The support material may have a surface area in the range of from about 10 to about 700 m/g, pore volume in the range of from about 0.1 to about 4.0 $g/cm^3$ and average particle size in the range of from about 5 to about 500 µm. More preferably, the surface area of the support material is in the range of from about 50 to about 500 m/g, pore volume of from about 0.5 to about 3.5 $g/cm^3$ and average particle size of from about 10 to about 200 µm. Most preferably the surface area of the support material is in the range is from about 100 to about 400 m/g, pore volume from about 0.8 to about 3.0 $g/cm^3$ and average particle size is from about 5 to about 100 µm. The average pore size of the carrier typically has pore size in the range of from 10 to 1000 A, preferably 50 to about 500 A, and most preferably 75 to about 350 A.

The metal-ligand complex of Formula I, as well as other components discussed herein such as the activator and/or an additional polymerization component, may be slurried. Slurries are well known in the art. The slurry may include metal-ligand complex of Formula I, an activator, and a support, for instance.

A molar ratio of metal in the activator to metal in the metal-ligand complex of Formula I and/or an additional polymerization component in the slurry may be 1000:1 to 0.5:1, 300:1 to 1:1, or 150:1 to 1:1. One or more diluents, e.g., fluids, can be used to facilitate the combination of any two or more components in the slurry. For example, the metal-ligand complex of Formula I and the activator can be combined together in the presence of toluene or another non-reactive hydrocarbon or hydrocarbon mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the mixture or the metal-ligand complex/activator can be added to the support. The slurry may be fed to the reactor for the polymerization process, and/or the slurry may be dried, e.g., spay-dried, prior to being fed to the reactor for the polymerization process.

The polymerization process may be a suspension polymerization process, a slurry polymerization process, and/or a gas phase polymerization process. The polymerization process may utilize using known equipment and reaction conditions, e.g., known polymerization conditions. The polymerization process is not limited to any specific type of polymerization system. As an example, polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C. Embodiments provide a method of making a polyolefin polymer the method comprising: contacting, under polymerization conditions, an olefin with the polymerization catalyst, as described herein, to polymerize the olefin, thereby making a polyolefin polymer.

One or more embodiments provide that the polymers may be formed via a gas phase polymerization system, at super-atmospheric pressures in the range from 0.07 to 68.9 bar, from 3.45 to 27.6 bar, or from 6.89 to 24.1 bar, and a temperature in the range from 30° C. to 130° C., from 65°

C. to 110° C., from 75° C. to 120° C., or from 80° C. to 120° C. For one or more embodiments, operating temperatures may be less than 112° C. Stirred and/or fluidized bed gas phase polymerization systems may be utilized.

Generally, a conventional gas phase fluidized bed polymerization process can be conducted by passing a stream containing one or more olefin monomers continuously through a fluidized bed reactor under reaction conditions and in the presence of a catalytic composition, e.g., a composition including the metal complex of Formula I and the activator, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalytic composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

For the polymerization process, polymerization catalyst may be continusouly fed to the reactor. A gas that is inert to the polymerization catalyst, such as nitrogen or argon, can be used to carry the polymerization catalyst into the reactor bed. In one embodiment, the polymerization catalyst can be provided as a slurry in mineral oil or liquid hydrocarbon or mixture such, as for example, propane, butane, isopentane, hexane, heptane or octane. The slurry may be delivered to the reactor with a carrier fluid, such as, for example, nitrogen or argon or a liquid such as for example isopentane or other $C_3$ to $C_8$ alkanes.

For the polymerization process, hydrogen may be utilized at a gas mole ratio of hydrogen to ethylene in the reactor that can be in a range having a lower limit of 0.0002, 0.0006, 0.001, 0.0016, 0.002, 0.004 to an upper limit of 0.1, 0.05, 0.01, 0.008, 0.006. A number of embodiments utilize hydrogen gas.

The polymerization process may use a gas-phase polymerization (GPP) reactor, such as a stirred-bed gas phase polymerization reactor (SB-GPP reactor) or a fluidized-bed gas-phase polymerization reactor (FB-GPP reactor), to make the polymer. Such reactors and methods are generally well-known. For example, the FB-GPP reactor/method may be as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

Polymerization operating conditions are any variable or combination of variables that may affect a polymerization reaction in the GPP reactor or a composition or property of a polymer made thereby. The variables may include reactor design and size; component compositions and amounts; molar ratios of different reactants; presence or absence of feed gases such as $H_2$ and/or $O_2$, molar ratio of feed gases versus reactants, absence or concentration of interfering materials, e.g., $H_2O$, absence or presence of an induced condensing agent (ICA), average polymer residence time in the reactor, partial pressures of constituents, feed rates of monomers, reactor bed temperature, e.g., fluidized bed temperature, nature or sequence of process steps, time periods for transitioning between steps. Variables other than that/those being described or changed by the method or use may be kept constant.

For the polymerization process, there can be control individual flow rates of ethylene ("$C_2$"), hydrogen ("$H_2$") and 1-hexene ("$C_6$" or "$C_x$," wherein x is 6) to maintain a fixed comonomer to ethylene monomer gas molar ratio ($C_x/C_2$, e.g., $C_6/C_2$) equal to a described value, e.g., 0.00500, a constant hydrogen to ethylene gas molar ratio ("$H_2/C_2$") equal to a described value, e.g., 0.00200, and a constant ethylene ("$C_2$") partial pressure equal to a described value, e.g., 1,000 kPa. The concentrations of gases may be measured by an in-line gas chromatograph to understand and maintain composition in the recycle gas stream. A reacting bed of growing polymer particles may be maintained in a fluidized state by continuously flowing a make-up feed and recycle gas through the reaction zone. A superficial gas velocity of 0.49 to 0.67 meter per second (m/sec) (1.6 to 2.2 feet per second (ft/sec)) may be utilized. The FB-GPP reactor may be operated at a total pressure of about 2344 to about 2413 kilopascals (kPa) (about 340 to about 350 pounds per square inch-gauge (psig)) and at a desired first reactor bed temperature. The fluidized bed may be maintained at a constant height by withdrawing a portion of the bed at a rate equal to the rate of production of particulate form of the bimodal ethylene-co-1-hexene copolymer composition, which production rate may be from 10 to 20 kilograms per hour (kg/hour). Product, e.g. a polymer such as bimodal ethylene-co-1-hexene copolymer composition, may be removed semi-continuously via a series of valves into a fixed volume chamber, wherein this removed bimodal ethylene-co-1-hexene copolymer composition is purged to remove entrained hydrocarbons and treated with a stream of humidified nitrogen ($N_2$) gas to deactivate any trace quantities of residual catalyst.

The catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

An induced condensing agent (ICA), e.g., an inert liquid useful for cooling materials in gas phase polymerization reactor(s), may be utilized. The ICA may be a ($C_5$-$C_{20}$) alkane, e.g., 2-methylbutane (i.e., isopentane). Aspects of the process that use the ICA may be referred to as being an induced condensing mode operation (ICMO). ICMO is described in U.S. Pat. Nos. 4,453,399; 4,588,790; 4,994,534; 5,352,749; 5,462,999; and 6,489,408. A concentration of ICA in gas phase may be measured using gas chromatography by calibrating peak area percent to mole percent (mol %) with a gas mixture standard of known concentrations of gas phase components. A concentration of the ICA may be from 1 to 10 mol %.

The polymerization process conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

The polymerization process may utilize a pilot scale fluidized bed gas phase polymerization reactor (Pilot Reactor) that comprises a reactor vessel containing a fluidized bed of a powder of the bimodal ethylene-co-1-hexene copolymer composition, and a distributor plate disposed above a bottom head, and defining a bottom gas inlet, and having an expanded section, or cyclone system, at the top of the reactor vessel to decrease amount of resin fines that may escape from the fluidized bed. The expanded section can define a gas outlet. The Pilot Reactor may further comprise a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor may further comprise a cooling system to remove heat of polymerization and maintain the fluidized bed at a target temperature. Compositions of gases such as ethylene, alpha-olefin (e.g., 1-hexene), and hydrogen being fed into the Pilot Reactor can be monitored by an in-line gas chromatograph in the cycle loop in order to maintain specific concentrations that define and enable control of polymer properties. A catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower 1/3 of its bed height. The Pilot Reactor may further comprise a way of weighing the fluidized bed and isolation ports (Product Discharge System) for discharging the powder of bimodal ethylene-co-1-hexene copolymer composition from the reactor vessel in response to an increase of the fluidized bed weight as polymerization reaction proceeds.

In some embodiments the FB-GPP reactor is a commercial scale reactor such as a UNIPOL™ reactor or UNIPOL™ II reactor, which are available from Univation Technologies, LLC, a subsidiary of The Dow Chemical Company, Midland, Mich., USA.

A number of aspects of the present disclosure are provided as follows.

Aspect 1 provides a metal-ligand complex of Formula I:

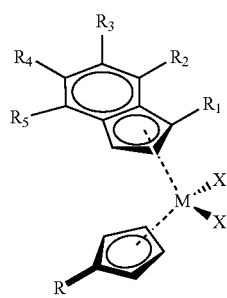

Formula I wherein M is titanium, zirconium, or hafnium; R is hydrogen or a ($C_1$ to $C_4$) alkyl; $R^1$ is a ($C_1$ to $C_4$) alkyl; any one or two of $R^2$, $R^3$, $R^4$, $R^5$ is independently a ($C_1$ to $C_{20}$) alkyl and the three or two of $R^2$, $R^3$, $R^4$, $R^5$ is H; and each X is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl.

Aspect 2 provides a metal-ligand complex of Formula II:

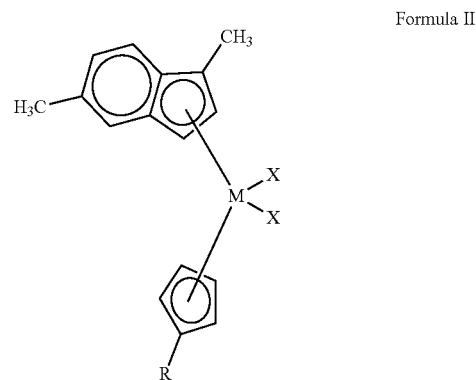

Formula II wherein R is hydrogen or a ($C_1$ to $C_2$) alkyl, M is titanium, zirconium, or hafnium, and where each X is independently a halide, a ($C_1$ to $C_{20}$) alkyl, a ($C_7$ to $C_{20}$) aralkyl, a ($C_1$ to $C_6$) alkyl-substituted ($C_6$ to $C_{12}$) aryl, a ($C_1$ to $C_6$) alkyl-substituted benzyl, or a silicon-containing alkyl.

Aspect 3 provides the metal-ligand complex of aspect 1 or aspect 2, wherein R is hydrogen.

Aspect 4 provides the metal-ligand complex of aspect 1 or aspect 2, wherein R is a ($C_1$ to $C_2$) alkyl.

Aspect 5 provides the metal-ligand complex of any one of aspects 1 and 4, wherein R is methyl.

Aspect 6 provides the metal-ligand complex of any one of aspects 1 and 4, wherein R is ethyl.

Aspect 7 provides the metal-ligand complex of any one of aspects 1-6 wherein M is Zr.

Aspect 8 provides the metal-ligand complex of any one of aspects 1-7 wherein each X is independently Cl, a ($C_1$ to $C_3$) alkyl, or benzyl.

Aspect 9 provides the metal-ligand complex of aspect 1 or aspect 2 selected from:
  wherein R is hydrogen, M is zirconium, and each X is Cl;
  wherein R is methyl, M is zirconium, and each X is Cl;
  wherein R is ethyl, M is zirconium, and each X is Cl;
  wherein R is hydrogen, M is zirconium, and each X is methyl;
  wherein R is methyl, M is zirconium, and each X is methyl; and wherein R is ethyl, M is zirconium, and each X is methyl.

Aspect 10 provides a bimodal catalyst system comprising the metal-ligand complex of any one of aspects 1-9 and a bis(2-(pentamethylphenylamido)ethyl)-amine zirconium complex of Formula III:

Formula III

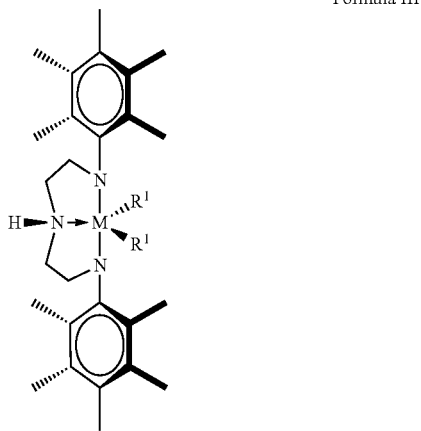

wherein M is Zr and each $R^1$ independently is Cl, Br, a ($C_1$ to $C_{20}$) alkyl, a ($C_1$ to $C_6$) alkyl-substituted ($C_6$-$C_{12}$) aryl, benzyl, or a ($C_1$ to $C_6$) alkyl-substituted benzyl.

Aspect 11 provides a method of making a polymerization catalyst, the method comprising contacting, under activating conditions, the metal-ligand complex of any one of aspects 1-9 or the bimodal catalyst system of aspect 10 with an activator so as to activate the metal-ligand complex or the bimodal catalyst system, thereby making the polymerization catalyst.

Aspect 12 provides the method of aspect 11 wherein the activator is methylaluminoxane.

Aspect 14 provides a polymerization catalyst made by the method of any one of aspects 11-12.

Aspect 14 provides a method of making a polyolefin polymer, the method comprising:
  contacting, under polymerization conditions, an olefin with the polymerization catalyst of aspect 13 so as to polymerize the olefin, thereby making a polyolefin polymer.

Aspect 15 provides a polyolefin polymer made by the method of aspect 14.

Aspect 16 provides the metal-ligand complex of any one of aspects 1 to 6, wherein M is zirconium or hafnium.

EXAMPLES 3,6-Dimethyl-1H-indene, which may be represented by the following formula:

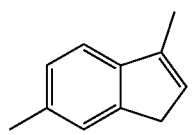

was prepared as follows. 3,6-Dimethyl-1H-indene, when deprotonated can form an anion that may be referred to as 1,5-dimethyl-indenyl. In a glove box, a 250-mL two-neck container fitted with a thermometer (side neck) and a solids addition funnel, was charged with tetrahydrofuran (25 mL) and methylmagnesium bromide (2 equivalents, 18.24 mL, 54.72 mmol). The contents of the container were cooled in a freezer set at −35° C. for 40 minutes; when removed from the freezer, the contents of the container were measured to be −12° C. While stirring, indanone [5-Methyl-2,3-dihydro-1H-inden-1-one (catalog # HC-2282)] (1 equivalent, 4.000 g, 27.36 mmol) was added to the container as a solid in small portions and the temperature increased due to exothermic reaction; additions were controlled to keep the temperature at or below room temperature. Once the addition was complete, the funnel was removed, and the container was sealed (SUBA). The sealed container was moved to a fume hood (with the contents already at room temperature) and put under a nitrogen purge, then stirred for 3 hours. The nitrogen purge was removed, diethyl ether (25 mL) was added to the container to replace evaporated solvent, and then the reaction was cooled using an acetone/ice bath. A HCl (15% volume) solution (9 equivalents, 50.67 mL, 246.3 mmol) was added to the contents of the container very slowly using an addition funnel, the temperature was maintained below 10° C. Then, the contents of the container were warmed up slowly for approximately 12 hours (with the bath in place). Then, the contents of the container were transferred to a separatory funnel and the phases were isolated. The aqueous phase was washed with diethyl ether (3×25 mL). The combined organic phases were then washed with sodium bicarbonate (50 mL, saturated aqueous solution), water (50 mL), and brine (50 mL). The organic phase was dried over magnesium sulfate, filtered and the solvent removed by rotary evaporator. The resulting dark oil, confirmed as product by NMR, was dissolved in pentane (25 mL), then filtered through a short silica plug (pre-wetted with pentane) that was capped with sodium sulfate. Additional pentane (25-35 mL) was used to flush the plug, then were combined with the first. The solution was dried by rotary evaporator resulting in 2.87 g (74% yield) of 3,6-dimethyl-1H-indene that was confirmed as product by NMR. $^1$H NMR ($C_6D_6$): δ 7.18 (d, 1H), 7.09 (s, 1H), 7.08 (d, 1H), 5.93 (mult, 1H), 3.07 (mult, 2H), 2.27 (s, 3H), 2.01 (q, 3H).

Example 1, cyclopentadienyl(1,5-dimethylindenyl) zirconium dimethyl, was prepared as follows. In a glovebox, 3,6-dimethyl-1H-indene (1.000 g, 6.94 moles) in dimethoxyethane (10 mL) was added to a 4-oz container, which was then capped, and the contents of the container were chilled to −35° C. Butyllithium (1.6M hexanes, 4.3 mL, 0.0069 mole) was added to the container and the contents were stirred for approximately 3 hours while heat was removed to maintain the contents of the container near −35° C. Reaction progress was monitored by dissolving a small aliquot in d8-THF for $^1$H NMR analysis; when the reaction was complete, solid cyclopentadienyl zirconium trichloride (CpZrCl$_3$) (1.821 g) was added in portions to the contents of the container while stirring. Reaction progress was monitored by dissolving a small aliquot in d8-THF for $^1$H NMR analysis; the reaction was complete after approximately 3 hours and the contents of the container were stirred for approximately 12 more hours. Then, methylmagnesium bromide (3.0M in ether, 4.6 mL) was added to the contents of the container, after the addition the contents of the container were stirred for approximately 12 hours. Then, solvent was removed in vacuo and the product was extracted into hexane (40 mL) and filtered through Celite, washed with additional hexane (30 mL) and then dried in vacuo to provide the cyclopentadienyl(1,5-dimethylindenyl) zirconium dimethyl. Cyclopentadienyl(1,5-dimethylindenyl) zirconium dimethyl was confirmed by $^1$H NMR analysis. $^1$H NMR (C$_6$D$_6$): δ 7.26 (d, 1H), 6.92 (d, 1H), 6.83 (dd, 1H), 5.69 (d, 1H), 5.65 (mult, 1H), 5.64 (s, 5H), 2.18 (s, 3H), 2.16 (s, 3H), −0.34 (s, 3H), −0.62 (s, 3H).

Example 2, cyclopentadienyl(1,5-dimethylindenyl) zirconium dichloride, was prepared as follows. In a glovebox, 3,6-dimethyl-1H-indene (5.00 g, 34.7 mmol) and hexane (100 mL) were charged to a container. While stirring with magnetic stir bar, n-butyllithium (1.6M in hexanes, 23.8 mL, 38.1 mmol) was added slowly to the contents of the container, which were then stirred for approximately 12 hours to provide a precipitate that was observed to be solid and white. The precipitate was collected by filtration, washed with hexane (3×20 mL), and dried in vacuo to provide 1,5-dimethylindenyllithium (4.88 g, 93.7% yield), observed to be a white solid.

Then, in a glovebox, a portion of the 1,5-dimethylindenyllithium (2.315 g, 15.42 mmol) was dissolved in dimethoxyethane (60 mL) in a container, and then CpZrCl$_3$ (4.05 g, 15.42 mmol) was added in portions as a solid. After stirring for approximately 12 hours, solvents were removed in vacuo and contents of the container were taken up in toluene (110 mL) at 60° C. and filtered. Then, NMR analysis of an aliquot indicated the desired product. To purify the product, the volume of the filtrate was reduced in vacuo to 40 mL and the temperature raised to 80° C. to dissolve. Then, the solution was cooled slowly to room temperature and then held in a glovebox freezer (−32° C.) to precipitate the recrystallized product, which was collected by filtration and washed with hexane (2×10 mL), then dried in vacuo to yield cyclopentadienyl(1,5-dimethylindenyl) zirconium dichloride, observed to be a bright yellow solid (4.09 g, 71.6%). $^1$H NMR (C$_6$D$_6$): d 7.32 (m, 1H), 6.90 (dt, 1H), 6.75 (dd, 1H), 6.19 (dq, 1H), 5.76 (s, 5H), 5.73 (m, 1H), 2.35 (d, 3H), 2.08 (d, 3H).

Example 3, methylcyclopentadienyl(1,5-dimethylindenyl) zirconium dichloride was prepared as follows. 1,5-Dimethylindenyllithium was prepared as described in Example 2. In a glovebox, 1,5-dimethylindenyllithium (0.500 g, 3.33 mmol) was dissolved in dimethoxyethane (30 mL) in a container, and MeCpZrCl$_3$ (0.921 g, 3.33 mmol) was added in portions as a solid. After stirring for approximately 12 hours, solvents were removed in vacuo and contents of the container were taken up in dichloromethane (40 mL) and filtered. NMR analysis of an aliquot indicated the desired product. To purify the product, the volume of the filtrate was reduced in vacuo to 20 mL and hexane (20 mL) was added. Then, the solution was held in a glovebox freezer (−32° C.) to precipitate the recrystallized product, which was collected by filtration and washed with hexane (3×5 mL), then dried in vacuo to yield methylcyclopentadienyl (1,5-dimethylindenyl) zirconium dichloride (0.527 g, 41.1%). $^1$H NMR (C$_6$D$_6$): δ 7.32 (m, 1H), 6.93 (m, 1H), 6.75 (dd, 1H), 6.25 (dd, 1H), 5.76 (m, 2H), 5.58 (m, 1H), 5.52 (m, 1H), 5.38 (td, 1H), 2.37 (d, 3H), 2.09 (d, 3H), 2.01 (s, 3H).

Example 4, propylcyclopentadienyl(1,5-dimethylindenyl) zirconium dichloride, was prepared as follows. 1,5-Dimethylindenyllithium was prepared as described in Example 2. In a glovebox, 1,5-dimethylindenyllithium (0.500 g, 3.33 mmol) was dissolved in dimethoxyethane (30 mL) in a container, and PrCpZrCl$_3$(DME) (1.315 g, 3.33 mmol) was added in portions as a solid. After stirring for approximately 12 hours, solvents were removed in vacuo and contents of the container were taken up in toluene (50 mL) and filtered. NMR analysis of an aliquot indicated the desired product. To purify the product, the volume of the filtrate was reduced in vacuo to 25 mL and hexane (25 mL) was added. The resulting mixture was heated to 60° C. to dissolve and then was held in a glovebox freezer (−32° C.) to precipitate the recrystallized product, which was collected by filtration and washed with hexane (3×5 mL), then dried in vacuo to yield propylcyclopentadienyl(1,5-dimethylindenyl) zirconium dichloride (0.893 g, 65.0%). $^1$H NMR (C$_6$D$_6$): δ 7.34 (m, 1H), 6.96 (m, 1H), 6.77 (dd, 1H), 6.27 (dd, 1H), 5.85 (m, 1H), 5.81 (dd, 1H), 5.68 (dt, 1H), 5.57 (td, 1H), 5.46 (td, 1H), 2.47 (td, 2H), 2.39 (d, 3H), 2.11 (d, 3H), 1.36 (m, 2H), 0.75 (t, 3H).

4,7-Dimethyl-1H-indene was prepared by one of the following two methods (Method A or Method B).

Method A.

A 500 mL two-necked round bottomed container equipped with a magnetic stir bar, a powder addition funnel containing aluminum chloride (16.04 g, 120.3 mmol), a nitrogen inlet, and an outlet which purges to a NaOH scrubber was flushed with dry nitrogen gas. The container was charged with anhydrous dichloromethane (70 mL) followed by p-xylene (14.91 g, 140.5 mmol) and 3-chloropropionyl chloride (13.35 g, 105.1 mmol) and then cooled using an ice water bath. Excess aluminum chloride was then added over 90 min via the powder addition funnel, then the container was warmed to 10° C. and then stirred for approximately 2 hours. The contents of the container were then poured onto ice, resulting in a color change from red to yellow. The organic layer was separated and washed three times with water, dried over anhydrous magnesium sulfate, filtered, and condensed under vacuum to form an intermediate, observed to be a yellow liquid. Then, sulfuric acid (60 mL) was added to a container; the intermediate was added to the container via syringe over 30 minutes and the contents of the container were slowly heated to 65° C. and maintained at this temperature for two hours. The contents of the container were cooled to room temperature, poured over ice, and extracted with diethyl ether (100 mL). The organic layer was washed with sodium bicarbonate solution and water, dried over anhydrous magnesium sulfate, and condensed under vacuum to provide a crude product, observed to be a tan colored solid. Purification by column chromatography (SiO$_2$, hexanes:ethyl acetate=90:10) provided 4,7-dimethylindan-1-one, observed to be a light yellow/tan colored solid (11.82 g, 70.43%).

4,7-Dimethylindan-1-one (8.040 g, 50.18 mmol), methanol (150 mL) and THF (50 mL) were added to a 500 mL two-necked round bottom container equipped with a magnetic stir bar, removable cap, and reflux condenser with attached nitrogen inlet. The contents of the container were cooled with ice bath to temperature of 5° C. Sodium borohydride (1.96 g, 51.81 mmol) was added, portion wise via the removable cap over a period of 60 minutes while stirring, to the container; gas evolution was allowed to cease between each addition. The contents of the container were allowed to warm to room temperature and stirred for approximately 17 hours. The contents of the container were quenched by the addition of ice, concentrated under vacuum, and extracted with ethyl acetate. The organic layer was separated, dried over anhydrous magnesium sulfate, filtered and concentrated to provide 4,7-dimethylindan-1-ol, observed to be a tan solid (7.56 g, 93.3%).

4,7-Dimethylindan-1-ol (8.56 g, 52.8 mmol), toluene (800 mL), and p-toluene sulfonic acid (p-TSA) (0.188 g, 0.99 mmol) were added to a 1000 mL round bottomed container equipped with a magnetic stir bar and reflux condenser with attached nitrogen inlet. The contents of the container were heated at 45° C., and reaction progress was monitored by GC/MS. After 4 hours, molecular sieves were added to the container, and heating was continued. After 6 hours, the reaction was quenched with saturated sodium bicarbonate solution. The organic layer was separated, dried over anhydrous magnesium sulfate, filtered and concentrated to provide a crude product, observed to be a light-yellow liquid. Purification by column chromatography (SiO$_2$, hexanes) provided 4,7-dimethyl-1H-indene, observed to be colorless liquid (5.68 g, 74.7%).

Method B

A solution of sodium methoxide in methanol (5 M, 170.5 mL, 852.5 mmol) was charged to a 3-neck round bottom container; the contents of the container were cooled to 0° C. Freshly cracked and distilled cyclopentadiene (34.3 mL, 511.5 mmol) was added to the container over 20 minutes. The contents of the container were stirred for approximately 2 hours under a nitrogen atmosphere and at a temperature of 0° C. 2,5-Hexanedione (40 mL, 340.9 mmol) was added dropwise using an addition funnel over 30 minutes. The contents of the container were stirred for approximately 12 hours at ambient temperature. The volatiles were removed in vacuo, and water (150 mL) and ether (250 mL) were added. The organic and aqueous layers were separated, and the aqueous layer extracted twice with diethyl ether (50 mL). The organic layer was washed with saturated sodium chloride, dried over magnesium sulfate and the solvent was removed in vacuo. Purification by distillation (bp. 65° C., 0.01 mmHg) provided 4,7-dimethyl-1H-indene, observed to be a pale-yellow oil (35 g, 71% yield). Further synthetic steps discussed herein may be performed using 4,7-dimethyl-1H-indene obtained via either Method A or Method B.

Comparative Example A, cyclopentadienyl(4,7-dimethylindenyl) zirconium dimethyl, was prepared as follows.

4,7-Dimethyl-1H-indene (5.60 g, 39.4 mmol) was dissolved in hexanes (100 mL) in a 200 mL glass container equipped with a stir bar. A solution of n-butyllithium in hexanes (2.5 M, 17 mL, 43 mmol) was slowly added to the container at room temperature. The contents of the container were stirred at room temperature for approximately 17 hours, and the resultant white precipitate was collected by vacuum filtration, washed with hexanes, and dried under vacuum to yield 4,7-dimethylindenyllithium (5.27 g, 90.4%), observed to be an off-white solid.

4,7-Dimethylindenyllithium (2.33 g, 15.5 mmol) in diethyl ether (100 mL) was added to a glass container (110 mL) equipped with a stir bar. CpZrCl$_3$.DME (5.50 g, 15.6 mmol) and diethyl ether (20 mL) was added to the container resulting in immediate formation of an observed to be bright yellow solution and precipitate. The contents of the container were stirred for approximately 17 hours, then diluted with dichloromethane (80 mL) and filtered. The filtrate is concentrated under vacuum to provide cyclopentadienyl(4,7-dimethylindenyl) zirconium dichloride, observed to be a bright yellow solid (3.72 g, 65.1%).

Comparative Example B, methylcyclopentadienyl(4,7-dimethylindenyl) zirconium dimethyl, was prepared was prepared as follows.

4,7-Dimethylindenyllithium was prepared as previously described. 4,7-Dimethylindenyllithium (0.800 g, 5.33 mmol) in diethyl ether (100 mL) was added to a glass container (200 mL) equipped with a stir bar. MeCpZrCl$_3$.DME (1.95 g, 5.34 mmol) was added to the container resulting in immediate formation of an observed to be bright yellow solution and precipitate. The contents of the container were stirred for approximately 17 hours, then diluted with dichloromethane (20 mL) and filtered. The filtrate was concentrated under vacuum, and the resultant yellow solid suspended in hexane (100 mL) and collected by vacuum filtration. The crude residue was recrystallized first from diethyl ether (20 mL) and dichloromethane (10 mL), and then from toluene (40 mL) and hexanes (10 mL). The crystals were collected and dried under vacuum to provide methylcyclopentadienyl(4,7-dimethylindenyl) zirconium dichloride, observed to be a bright yellow solid (0.471 g, 23.1%).

Example 1-CAT, a polymerization catalyst, was prepared as follows. Treated fumed silica (Cabosil TS-610; 1.33 grams) was slurried in toluene (38 grams), followed by addition of a 10% solution (11 g) by weight of methylaluminoxane (MAO) in toluene. Next, Example 1 (0.42 grams) was added and the mixture was stirred for approximately 45 minutes and thereafter introduced into an atomizing device. The atomizing device produced droplets that were then contacted with a hot nitrogen gas stream to evaporate the liquid and form a powder. The powder was separated from the gas mixture in a cyclone separator and discharged into a container. The spray drier temperature was set at 140° C. and the outlet temperature at 75° C. Example 1-CAT was collected as a fine powder. Loadings were kept at a constant 50 umol/g, corresponding to an Al:Zr ratio of approximately 100.

Example 2-CAT, a polymerization catalyst, was prepared as Example 1-CAT with the change that Example 2 was utilized rather than Example 1.

Example 3-CAT, a polymerization catalyst, was prepared as Example 1-CAT with the change that Example 3 was utilized rather than Example 1.

Example 4-CAT was prepared as Example 1-CAT with the change that Example 4 was utilized rather than Example 1.

Comparative Example A-CAT was prepared as Example 1-CAT with the change that Comparative Example A was utilized rather than Example 1.

Comparative Example B-CAT was prepared as Example 1-CAT with the change that Comparative Example B was utilized rather than Example 1.

A polymerization utilizing Comparative Example B-CAT was performed utilizing a gas phase Pilot Reactor operating at 105 C, a C6/C2 ratio of 0.0050, a H2/C2 ratio of 0.0020, with 9 mole percent isopentane and an ethylene partial pressure of 220 psi. Thereafter, a number of polymer properties were determined, such as melt index (I$_2$) as determined according to ASTM D1238-13 (at 190° C., 2.16 kg load); catalyst activity (grams polymer/gram catalyst-hour) as determined as a ratio of polymer yield to the amount of catalyst added to the reactor; melting temperature (T$_m$) determined via Differential Scanning calorimetry according to ASTM D 3418-08, density according to ASTM D-792-13, Mn, Mw, Mz, and Mw/Mn were determined by gel permeation chromatography (GPC). The results are reported in Table 1.

Based upon the Comparative Example B-CAT polymerization, Example 1-CAT, Example 2-CAT, and Comparative Example A-CAT were expected to have the melt index, catalyst activity, melting temperature, density, Mn, Mw, Mz, and Mw/Mn as reported in Table 1.

TABLE 1

| | Melt Index (I₂) (g/10 min) | Melting Temp. (° C.) | Catalyst Activity (grams polymer/ grams catalyst) | Density | Mn | Mw | Mz | Mw/Mn |
|---|---|---|---|---|---|---|---|---|
| Example 1-CAT | 210 | 131 | 25000 | 0.961 | 8289 | 25730 | 49089 | 3.10 |
| Example 2-CAT | 210 | 131 | 25000 | 0.961 | 8289 | 25730 | 49089 | 3.10 |
| Comparative Example A-CAT | 310 | 130 | 30000 | 0.959 | 6766 | 22478 | 44608 | 3.32 |
| Comparative Example B-CAT | 319 | 130 | 23484 | 0.958 | 7871 | 24757 | 46794 | 3.08 |

The data of Table 1 indicate that the polymers formed utilizing each of Example 1-CAT and Example 2-CAT are expected to have a surprising and improved, i.e., reduced, melt index (I₂) as compared to polymers formed utilizing each of Comparative Example A-CAT and Comparative Example B-CAT.

The data of Table 1 also indicate that the polymers formed utilizing each of Example 1-CAT and Example 2-CAT are expected to have a surprising and improved, i.e., increased, melting temperature as compared to polymers formed utilizing each of Comparative Example A-CAT and Comparative Example B-CAT.

The data of Table 1 also indicate that the polymers formed utilizing each of Example 1-CAT and Example 2-CAT are expected to have a surprising and improved, i.e., increased, molecular weight (Mn, Mw, and/or Mz) as compared to polymers formed utilizing each of Comparative Example A-CAT and Comparative Example B-CAT.

The data of Table 1 also indicate that the polymers formed utilizing each of Example 1-CAT and Example 2-CAT are expected to have a surprising and improved, i.e., increased, density as compared to polymers formed utilizing each of Comparative Example A-CAT and Comparative Example B-CAT.

1,4-Dimethylindenyllithium was synthesized as follows. A solution of 4-methyl-1-indanone (5.00 g, 34.2 mmol) in THF (20 mL) was added to a container including a solution of methylmagnesium bromide (3.0 M in ether, 22.8 mL, 68 mmol) in THF (50 mL) over 15 min at a temperature of approximately 0° C. The contents of the container were stirred at room temperature for 3 hr and then cooled in a dry ice/acetone bath, and HCl 15% (100 mL) was added slowly in a fume hood under a nitrogen purge. The contents of the container were stirred while warming to room temperature. Ether (40 mL) was added and the organic layer was separated. The aqueous fraction was extracted with ether (3×40 mL), and the combined organic fractions were washed with saturated sodium bicarbonate, water, and brine; and then dried over magnesium sulfate. After filtration and evaporation of the volatiles from the filtrate, the crude dimethylindene was dissolved in hexane (about 60 mL), passed through silica gel, and treated with BuLi (21 mL, 33.6 mmol). After stirring for approximately 12 hrs, 1,4-dimethylindenyllithium was collected by filtration, washed with hexane, and dried with vacuum. Yield=4.441 g (86.5%) of white solid. ¹H NMR (400 MHz, THF-d₈) δ 7.14 (dq, J=8.1, 0.8 Hz, 1H), 6.42 (dd, J=8.1, 6.5 Hz, 1H), 6.30 (dd, J=3.1, 0.7 Hz, 1H), 6.28 (dp, J=6.5, 0.9 Hz, 1H), 5.73 (dd, J=3.2, 0.8 Hz, 1H), 2.41 (d, J=0.6 Hz, 3H), 2.40 (d, J=0.7 Hz, 4H).

1,6-Dimethylindenyllithium was synthesized as follows. Under a nitrogen atmosphere, 6-methyl-1-indanone (3.00 g, 20.52 mmol) was dissolved in toluene (20 mL), and cooled to about −35° C. Trimethylaluminum (2.0M in toluene, 21.6 mL, 43.1 mmol) was added and the resulting mixture stirred overnight and then diluted with ether (100 mL) and cooled in an ice bath, and quenched by adding 6M HCl (30 mL) under a flow of nitrogen. The resulting biphasic mixture was stirred for about 2 hr for conversion to the dimethylindene. The organic layer was separated and washed with water (2×40 mL), saturated sodium bicarbonate (40 mL), and brine (40 mL); dried over magnesium sulfate; and filtered. The resulting mixture was concentrated on a rotary evaporator at 100 torr for about one hour, then placed into a glovebox, diluted with hexane (80 mL), and filtered through silica. n-Butyllithium (1.6M in hexanes, 12.8 mL, 20.5 mmol) was added and the mixture was stirred for approximately three days. A white precipitate was collected by filtration, washed thoroughly with hexane (3×20 mL) and dried with vacuum to yield 1,6-dimethylindenyllithium (2.561 g). ¹H NMR (400 MHz, THF-d₈) δ 7.16 (dd, J=8.1, 0.7 Hz, 1H), 7.03 (dq, J=1.8, 0.9 Hz, 1H), 6.30 (dd, J=8.1, 1.7 Hz, 1H), 6.26 (d, J=3.2, 1H), 5.65 (dd, J=3.2, 0.8 Hz, 1H), 2.40-2.37 (m, 3H), 2.32 (d, J=0.9 Hz, 3H).

1,7-Dimethylindenyllithium was synthesized as follows. The synthesis described for 1,6-dimethylindenyllithium was repeated, except that 7-methyl-1-indanone (4.795 g, 32.80 mmol) was used. Yield was 4.152 g (84.31%) of 1,7-dimethylindenyllithium. ¹H NMR (400 MHz, THF-d₈) δ 7.07 (d, J=8.1 Hz, 1H), 6.28 (dd, J=8.1, 6.5 Hz, 1H), 6.24-6.18 (m, 1H), 6.12 (dp, J=6.5, 1.0 Hz, 1H), 5.66 (d, J=3.1 Hz, 1H), 2.68 (d, J=0.7 Hz, 3H), 2.66 (t, J=0.7 Hz, 3H).

1,5,7-Trimethylindenyllithium was synthesized as follows. The synthesis desribed for 1,6-dimethylindenyllithium was repeated, except 5,7-dimethyl-1-indanone (5.00 g, 31.2 mmol) was used and ether (approximately 1 mL) was added to the reaction mixture after the n-BuLi addition step. The 1,5,7-trimethylindenyllithium was obtained as a white solid. Yield=4.133 g (80.7%). ¹H NMR (400 MHz, THF-d₈) δ 6.84 (s, 1H), 6.14 (d, J=3.0 Hz, 1H), 6.00 (s, 1H), 5.56 (d, J=3.1 Hz, 1H), 2.66-2.64 (m, 3H), 2.62 (s, 3H), 2.21 (d, J=0.8 Hz, 3H).

1-Ethyl-5-methyl-indenyllithium was synthesized as follows. The synthesis of 1,4-dimethyl-indenyllithium was repeated except 5-methyl-1-indanone (5.00 g, 34.2 mmol) and ethylmagnesium bromide (3.0 M in ether, 22.8 mL, 68 mmol) were used. 1-Ethyl-5-methyl-indenyllithium was obtained as a pale orange solid (yield=4.192 g). ¹H NMR (400 MHz, THF-d₈) δ 7.22 (dt, J=8.1, 0.9 Hz, 1H), 7.04 (dq, J=1.8, 0.9 Hz, 1H), 6.33-6.29 (m, 2H), 5.62 (dd, J=3.1, 0.8 Hz, 1H), 2.84 (qd, J=7.5, 0.6 Hz, 2H), 2.29 (d, J=0.9 Hz, 4H), 1.26 (t, J=7.5 Hz, 3H).

Example 5, cyclopentadienyl(1,4-dimethylindenyl)zirconium dichloride was synthesized as follows. In a glovebox, 1,4-dimethylindenyllithium (0.500 g, 3.33 mmol) was dissolved in dimethoxyethane (30 mL) and added to a container. Cyclopentadienylzirconium trichloride (0.875 g, 3.33 mmol) was added to the container in portions as a solid. The contents of the container were stirred for approximately 48 hours. Then solvents were removed with vacuum and the residue was taken up in toluene (80 mL), filtered through Celite, and washed with additional toluene (2×10 mL). Solvents were removed from the filtrate with vacuum, and the residue was recrystallized from a dichloromethane solution (ca 7 mL) by layering hexane (ca 20 mL) on top. The product was isolated by decantation, rinsed with hexane and dried with vacuum to yield a bright yellow solid. Yield=0.686 g (65.3%). $^1$H NMR (400 MHz, Benzene-$d_6$) δ 7.28 (dq, J=8.5, 0.8 Hz, 1H), 6.92 (dd, J=8.6, 6.7 Hz, 1H), 6.73 (dp, J=6.7, 1.1 Hz, 1H), 6.09-5.97 (m, 1H), 5.83 (dd, J=3.2, 0.9 Hz, 1H), 5.78 (s, 5H), 2.21 (s, 6H).

Example 6, cyclopentadienyl(1,6-dimethylindenyl)zirconium dichloride was synthesized as follows. Cyclopentadienylzirconium trichloride (0.875 g, 3.33 mmol) was dissolved in dimethoxyethane (40 mL) and added to a container. 1,6-Dimethylindenyllithium (0.500 g, 3.33 mmol) was added to the container in portions as a solid. The contents of the container were stirred for approximately 48 hours. Then solvents were removed with vacuum and the residue was taken up in a mixture of dichloromethane (40 mL) and hexane (30 mL) and filtered. The volume of the filtrate was reduced with vacuum to 55 mL, and held in the freezer. The product crystallized at reduced temperature as a yellow solid which is collected by filtration, was washed with hexane (3×5 mL) and dried with vacuum. Yield=0.681 g (55.2%). $^1$H NMR (400 MHz, Benzene-$d_6$) δ 7.24 (tq, J=2.1, 1.0 Hz, 1H), 7.03 (dt, J=8.5, 0.6 Hz, 1H), 6.72 (dd, J=8.6, 1.5 Hz, 1H), 6.21 (dd, J=3.2, 0.7 Hz, 1H), 5.77 (s, 5H), 5.75 (dd, J=3.2, 0.9 Hz, 1H), 2.37 (d, J=0.6 Hz, 3H), 2.11 (d, J=1.1 Hz, 3H).

Example 7, cyclopentadienyl(1,7-dimethylindenyl)zirconium dichloride was synthesized as follows. Cyclopentadienylzirconium trichloride (0.875 g, 3.33 mmol) was dissolved in dimethoxyethane (40 mL) and added to a container. 1,7-Dimethylindenyllithium (0.500 g, 3.33 mmol) was added to the container in portions as a solid. The contents of the container were stirred for approximately 4 hours. Then solvents were removed with vacuum and the residue was taken up in toluene (50 mL) and filtered. Solvents were removed with vacuum and the product was recrystallized from a mixture of toluene (~40 mL) and hexane (~10 mL), by dissolving at 55° C. and cooling to −35° C. to yield the product as a bright yellow solid, 0.844 g (68.4%). $^1$H NMR (400 MHz, Benzene-$d_6$) δ 6.95-6.89 (m, 1H), 6.73 (dd, J=8.5, 6.8 Hz, 1H), 6.60 (dp, J=6.8, 1.1 Hz, 1H), 6.17 (dd, J=3.2, 0.7 Hz, 1H), 5.77 (s, 5H), 5.63 (d, J=3.2 Hz, 1H), 2.55 (d, J=0.6 Hz, 3H), 2.52 (d, J=1.0 Hz, 3H).

Example 8, cyclopentadienyl(1,5,7-trimethylindenyl)zirconium dichloride was synthesized as follows. 1,5,7-Trimethylindenyllithium (0.150 g, 0.914 mmol) was dissolved in dimethoxyethane (20 mL) and added to a container. Cyclopentadienylzirconium trichloride (0.240 g, 0.914 mmol) was added to the container in portions as a solid. The contents of the container were stirred for approximately 12 hours. Then solvents were removed with vacuum and the residue was taken up in toluene (ca 60 mL) and filtered. The volume of the filtrate was reduced with vacuum to 30 mL, heated to 50° C. to dissolve, filtered again to remove trace white solids, and recrystallized at reduced temperature from a solvent mixture of toluene (15 mL) and hexane (7 mL) to yield the product as a bright yellow solid. Yield=0.097 g (27.7%). $^1$H NMR (400 MHz, Chloroform-d) δ 7.19 (s, 1H), 6.79 (t, J=1.3 Hz, 1H), 6.47 (d, J=3.2 Hz, 1H), 6.20 (d, J=3.2 Hz, 1H), 6.17 (s, 5H), 2.70 (d, J=0.5 Hz, 3H), 2.66 (t, J=0.8 Hz, 3H), 2.40 (d, J=1.0 Hz, 3H).

Example 9, cyclopentadienyl(1-ethyl-5-methylindenyl)zirconium dichloride was synthesized as follows. 1-Ethyl-5-methylindenyllithium (0.600 g, 3.33 mmol) was dissolved in dimethoxyethane (30 mL) and added to a container. Cyclopentadienylzirconium trichloride (0.960 g, 3.33 mmol) was added to the container in portions as a solid. The contents of the container were stirred for approximately 12 hours. Then solvents were removed with vacuum and the residue was taken up in dichloromethane (30 mL) and filtered through Celite, and washed with additional dichloromethane (3×10 mL). The volume of the filtrate was reduced with vacuum to 20 mL, hexane (10 mL) added, and the product was crystallized at reduced temperature, collected by filtration, washed with hexane (2×10 mL), and dried with vacuum to yield 0.761 g. $^1$H NMR (400 MHz, Chloroform-d) δ 7.53 (d, J=8.7 Hz, 1H), 7.39 (m, 1H), 7.11 (dd, J=8.7, 1.5 Hz, 1H), 6.62 (d, J=3.2 Hz, 1H), 6.32 (dd, J=3.2, 0.8 Hz, 1H), 6.13 (s, 5H), 3.11-2.79 (m, 2H), 2.47 (d, J=1.2 Hz, 3H), 1.28 (t, J=7.5 Hz, 4H).

Example 10, methylcyclopentadienyl(1,4-dimethylindenyl)zirconium dichloride was synthesized as follows. 1,4-Dimethylindenyllithium (0.500 g, 3.33 mmol) was dissolved in dimethoxyethane (30 mL) and added to a container. Methylcyclopentadienylzirconium trichloride (0.921 g, 3.33 mmol) was added to the container in portions as a solid. The contents of the container were stirred for approximately 12 hours. Then solvents were removed with vacuum and the residue was taken up in toluene (50 mL) and filtered at room temp, and washed with more toluene (2×15 mL). The product was crystallized from a solvent mixture of toluene (20 mL) and hexane (20 mL) at reduced temperature, collected by filtration and washed with hexane to yield 1.027 g of product with about 94% purity (by NMR). For further purification, it was dissolved in dichloromethane (10 mL), and hexane (25 mL) carefully added as a top layer. After approximately 12 hours, the precipitated crystalline product was collected by decantation, washed with hexane and dried in vacuo to yield 0.569 g (44.4%) of the product. $^1$H NMR (400 MHz, Chloroform-d) δ 7.49 (dq, J=8.6, 0.8 Hz, 1H), 7.22 (dd, J=8.6, 6.7 Hz, 1H), 7.05 (dp, J=6.7, 1.0 Hz, 1H), 6.62 (d, J=3.3 Hz, 1H), 6.38 (dd, J=3.2, 0.9 Hz, 1H), 6.00 (q, J=2.6 Hz, 1H), 5.97 (q, J=3.8, 3.2 Hz, 1H), 5.94 (td, J=3.1, 2.4 Hz, 1H), 5.87 (td, J=3.1, 2.3 Hz, 1H), 2.46 (d, J=1.0 Hz, 3H), 2.46 (d, J=0.6 Hz, 3H), 2.18 (s, 3H).

Example 11, methylcyclopentadienyl(1,6-dimethylindenyl)zirconium dichloride was synthesized as follows. Methylcyclopentadienylzirconium trichloride (0.921 g, 3.33 mmol) was dissolved in dimethoxyethane (30 mL) and added to a container. 1,6-Dimethylindenyllithium (0.500 g, 3.33 mmol) was added to the container in portions as a solid. The contents of the container were stirred for approximately 1.5 hours and then were filtered to remove some salts; solvents were removed with vacuum from the filtrate. The residue was taken up in hexane (35 mL) and dichloromethane (30 mL), warmed to 40° C. and filtered again. The clear filtrate solution was concentrated to 45 mL and held in a freezer to produce a yellow crystalline solid which was collected by filtration, washed with hexane (3×5 mL), and dried with vacuum. Yield=0.646 g (50.5%). $^1$H NMR (400 MHz, Benzene-$d_6$) δ 7.24 (tt, J=2.0, 1.0 Hz, 1H), 7.09 (dd, J=8.7, 0.9 Hz, 1H), 6.74 (dd, J=8.7, 1.6 Hz, 1H), 6.26 (dd, J=3.3, 0.7 Hz, 1H), 5.81 (dd, J=3.2, 0.9 Hz, 1H), 5.75 (dtd, J=2.9, 2.3, 0.6 Hz, 1H), 5.59 (dtd, J=2.9, 2.3, 0.6 Hz, 1H), 5.51 (td, J=3.1, 2.3 Hz, 1H), 5.40 (td, J=3.1, 2.3 Hz, 1H), 2.38 (d, J=0.6 Hz, 3H), 2.11 (d, J=1.0 Hz, 3H), 2.02 (d, J=0.6 Hz, 3H).

Example 12, methylcyclopentadienyl(1,7-dimethylindenyl)zirconium dichloride was synthesized as follows. Methylcyclopentadienylzirconium trichloride (0.921 g, 3.33 mmol) was dissolved in dimethoxyethane (40 mL) and added to a container. 1,7-Dimethylindenyllithium (0.500 g, 3.33 mmol) was added to the container in portions as a solid. The contents of the container were stirred for approximately 16 hours. Then solvents were removed with vacuum and the residue was taken up in toluene (60 mL), warmed to about 60° C. and filtered. Solvents were removed from the filtrate with vacuum to yield a product as a yellow solid (1.250 g). The product was recrystallized at reduced temperature from a solvent mixture of toluene (45 mL) and hexane (12 mL). Yield=0.985 g (77.0%). $^1$H NMR (400 MHz, Chloroform-d) δ 7.43 (dp, J=8.5, 0.8 Hz, 1H), 7.11 (dd, J=8.5, 6.8 Hz, 1H), 6.92 (dp, J=6.8, 1.1 Hz, 1H), 6.53 (dd, J=3.2, 0.7 Hz, 1H), 6.28 (d, J=3.2 Hz, 1H), 6.12-6.07 (m, 1H), 5.96 (td, J=3.1, 2.3 Hz, 1H), 5.87-5.82 (m, 1H), 5.80 (td, J=3.1, 2.3 Hz, 1H), 2.74 (d, J=0.6 Hz, 3H), 2.70 (d, J=0.9 Hz, 3H), 2.17 (d, J=0.6 Hz, 3H).

Example 13, methylcyclopentadienyl(1,5,7-trimethylindenyl)zirconium dichloride was synthesized as follows. Methylcyclopentadienylzirconium trichloride (0.914 g, 3.30 mmol) was dissolved in dimethoxyethane (20 mL) and added to a container. 1,5,7-Trimethylindenyllithium (0.543 g, 3.30 mmol) was added to the container in portions as a solid. The contents of the container were stirred for approximately 12 hours. Then solvents were removed with vacuum and the residue was taken up in dichloromethane (20 mL) at 35° C., and filtered. Solvents were removed from the filtrate with vacuum to yield of product (1.377 g). The product was recrystallized at reduced temperature from a mixture of dichloromethane (25 mL) and hexane (25 mL) to yield a bright yellow solid. Yield was 0.793 g (60.2%). $^1$H NMR (400 MHz, Chloroform-d) δ 7.18 (td, J=1.7, 0.8 Hz, 1H), 6.77 (q, J=1.3 Hz, 1H), 6.46 (dd, J=3.1, 0.7 Hz, 1H), 6.16 (d, J=3.1 Hz, 1H), 6.11-6.06 (m, 1H), 5.96 (td, J=3.1, 2.3 Hz, 1H), 5.85 (qd, J=2.6, 1.4 Hz, 1H), 5.77 (td, J=3.1, 2.3 Hz, 1H), 2.70 (d, J=0.6 Hz, 3H), 2.66 (t, J=0.9 Hz, 3H), 2.39 (d, J=1.1 Hz, 3H), 2.16 (d, J=0.6 Hz, 3H).

Example 14, propylcyclopentadienyl(1,5-dimethylindenyl)zirconium dichloride was synthesized as follows. Propylcyclopentadienylzirconium trichloride, DME adduct (1.315 g, 3.33 mmol) were dissolved in dimethoxyethane (40 mL) and added to a container. 1,5,7-trimethylindenyllithium (0.500 g, 3.33 mmol) was added to the container in portions as a solid. The contents of the container were stirred for approximately 7 hours. Then solvents were removed with vacuum and the residue was taken up in toluene (50 mL) and filtered. The volume of the filtrate was reduced to 25 mL, hexane (25 mL) was added and the product was recrystallized at reduced temperature as a yellow solid, which was collected by filtration, washed with hexane (3×5 mL) and dried with vacuum. Yield=0.893 g (65.0%). $^1$H NMR (400 MHz, Benzene-d$_6$) δ 7.35 (dd, J=8.7, 1.0 Hz, 1H), 6.96 (h, J=1.0 Hz, 1H), 6.77 (dd, J=8.8, 1.5 Hz, 1H), 6.27 (dd, J=3.1, 0.7 Hz, 1H), 5.85 (dt, J=3.0, 2.3 Hz, 1H), 5.81 (dd, J=3.1, 0.9 Hz, 1H), 5.68 (dt, J=3.0, 2.3 Hz, 1H), 5.57 (td, J=3.1, 2.3 Hz, 1H), 5.46 (td, J=3.1, 2.3 Hz, 1H), 2.47 (td, J=7.5, 3.6 Hz, 2H), 2.39 (d, J=0.6 Hz, 3H), 2.11 (d, J=1.2 Hz, 3H), 1.43-1.30 (m, 2H), 0.75 (t, J=7.4 Hz, 3H).

Example 15, propylcyclopentadienyl(1,6-dimethylindenyl)zirconium dichloride was synthesized as follows. Propylcyclopentadienylzirconium trichloride, DME adduct (1.315 g, 3.33 mmol) was dissolved in dimethoxyethane (40 mL) and added to a container. 1,6-Dimethylindenyllithium (0.500 g, 3.33 mmol) was added to the container in portions as a solid. The contents of the container were stirred for approximately 12 hours. Then solvents were removed with vacuum, the residue was taken up in toluene (50 mL) and filtered. The toluene was removed from the filtrate with vacuum to yield 1.310 g of product, which was recrystallized from a solvent mixture of dichloromethane (15 mL) and hexane (30 mL) at reduced temperature as a yellow solid, which was collected by filtration, washed with hexane (3×5 mL) and dried with vacuum. Yield=0.6621 g (48.2%). $^1$H NMR (400 MHz, Benzene-d$_6$) δ 7.26 (tt, J=2.0, 1.0 Hz, 1H), 7.09 (dd, J=8.6, 0.9 Hz, 1H), 6.75 (dd, J=8.7, 1.5 Hz, 1H), 6.27 (dd, J=3.2, 0.7 Hz, 1H), 5.83 (td, J=3.0, 0.8 Hz, 2H), 5.66 (dt, J=3.0, 2.3 Hz, 1H), 5.54 (td, J=3.1, 2.3 Hz, 1H), 5.46 (td, J=3.1, 2.3 Hz, 1H), 2.53-2.44 (m, 2H), 2.39 (d, J=0.6 Hz, 3H), 2.11 (d, J=1.1 Hz, 3H), 1.43-1.30 (m, 2H), 0.75 (t, J=7.3 Hz, 3H).

Example 16, propylcyclopentadienyl(1,7-dimethylindenyl)zirconium dichloride was synthesized as follows. Propylcyclopentadienylzirconium trichloride, DME adduct (1.315 g, 3.33 mmol) was dissolved in dimethoxyethane (40 mL) and added to a container. 1,7-Dimethylindenyllithium (0.500 g, 3.33 mmol) was added to the container in portions as a solid. The contents of the container were stirred for approximately 16 hours. Then solvents were removed with vacuum, the residue was taken up in toluene (50 mL) and filtered. Solvents were removed from the filtrate with vacuum to yield the product as a yellow solid in high purity. Yield=1.316 g (95.8%). $^1$H NMR (400 MHz, Benzene-d$_6$) δ 6.99 (dp, J=8.5, 0.8 Hz, 1H), 6.77 (dd, J=8.5, 6.8 Hz, 1H), 6.61 (dp, J=6.8, 1.1 Hz, 1H), 6.24 (dd, J=3.2, 0.7 Hz, 1H), 5.87 (dt, J=3.0, 2.3 Hz, 1H), 5.70 (d, J=3.2 Hz, 1H), 5.65 (dt, J=2.9, 2.3 Hz, 1H), 5.57 (td, J=3.1, 2.3 Hz, 1H), 5.43 (td, J=3.1, 2.3 Hz, 1H), 2.58 (d, J=0.6 Hz, 3H), 2.54 (t, J=1.0 Hz, 3H), 2.49 (td, J=7.5, 3.3 Hz, 2H), 1.37 (dt, J=7.9, 7.3 Hz, 2H), 0.75 (t, J=7.3 Hz, 3H).

Example 17, propylcyclopentadienyl(1,5,7-trimethylindenyl)zirconium dichloride was synthesized as follows. Propylcyclopentadienylzirconium trichloride, DME adduct (1.203 g, 3.05 mmol) was dissolved in dimethoxyethane (40 mL) and added to a container. 1,5,7-Trimethylindenyllithium (0.500 g, 3.05 mmol) was added to the container in portions as a solid. The contents of the container were stirred for approximately 48 hours. Then solvents were removed with vacuum, the residue was taken up in toluene (60 mL) and filtered. Volume of the filtrate was reduced with vacuum to 25 mL, hexane (25 mL) was added, and the product was crystallized at reduced temperature. The product was collected by filtration and washed with hexane (3×5 mL) then dried with vacuum. Yield=0.895 g (68.9%). $^1$H NMR (400 MHz, Chloroform-d) δ 7.21-7.15 (m, 1H), 6.77 (t, J=1.3 Hz, 1H), 6.45 (dd, J=3.2, 0.7 Hz, 1H), 6.16 (d, J=3.2 Hz, 1H), 6.13-6.08 (m, 1H), 5.94 (td, J=3.1, 2.3 Hz, 1H), 5.90-5.85 (m, 1H), 5.81 (td, J=3.1, 2.3 Hz, 1H), 2.70 (d, J=0.6 Hz, 3H), 2.65 (t, J=0.9 Hz, 3H), 2.48 (td, J=7.5, 5.5 Hz, 2H), 2.39 (d, J=1.1 Hz, 3H), 1.51 (q, J=7.5 Hz, 2H), 0.89 (t, J=7.3 Hz, 3H).

It is expected that polymers formed utilizing polymerization catalysts respectively made from each of Examples 5-17 can have a surprising and improved, i.e., reduced, melt index ($I_2$) as compared to polymers formed utilizing each of Comparative Example A-CAT and Comparative Example B-CAT.

It is expected that polymers formed utilizing polymerization catalysts respectively made from each of Examples 5-17 can have a surprising and improved, i.e., increased, melting temperature as compared to polymers formed utilizing each of Comparative Example A-CAT and Comparative Example B-CAT.

It is expected that polymers formed utilizing polymerization catalysts respectively made from each of Examples 5-17 can have a surprising and improved, i.e., increased, molecular weight (Mn, Mw, and/or Mz) as compared to polymers formed utilizing each of Comparative Example A-CAT and Comparative Example B-CAT.

It is expected that polymers formed utilizing polymerization catalysts respectively made from each of Examples 5-17 can have a surprising and improved, i.e., increased, density as compared to polymers formed utilizing each of Comparative Example A-CAT and Comparative Example B-CAT.

What is claimed is:

1. A metal-ligand complex of Formula II,

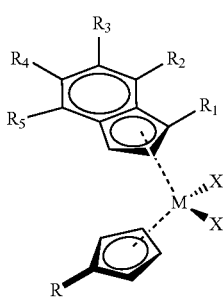

Formula I wherein R is hydrogen, M is zirconium, and where each X is a $C_1$ alkyl.

2. A bimodal catalyst system comprising the metal-ligand complex of claim 1 and a bis(2-(pentamethylphenylamido)ethyl)-amine zirconium complex of Formula III:

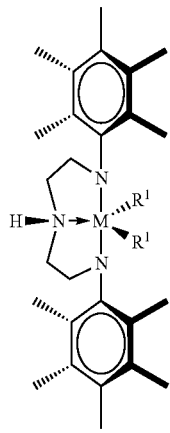

Formula III wherein M is Zr and each R1 independently is Cl, Br, a (C1 to C20) alkyl, a (C1 to C6) alkyl-substituted (C6-C12) aryl, benzyl, or a (C1 to C6) alkyl-substituted benzyl.

3. A method of making a polymerization catalyst, the method comprising contacting, under activating conditions, the metal-ligand complex of claim 1 with an activator so as to activate the metal-ligand complex or the bimodal catalyst system, thereby making the polymerization catalyst.

4. The method of claim 3 wherein the activator is methylaluminoxane.

5. A polymerization catalyst made by the method of claim 3.

6. A method of making a polyolefin polymer, the method comprising:

contacting, under polymerization conditions, an olefin with the polymerization catalyst of claim 5 so as to polymerize the olefin, thereby making a polyolefin polymer.

* * * * *